Patented May 8, 1934

1,957,888

UNITED STATES PATENT OFFICE 1,957,888

PROCESS FOR TINTING, DYEING OR BACKING PHOTOGRAPHIC FILM

Kenneth C. D. Hickman, Rochester, N. Y., assignor to Eastman Kodak Company, Rochester, N. Y., a corporation of New York No Drawing. Application January 4, 1930, Serial No. 418,652

9 Claims. (Cl. 95—9)

This invention relates to a process of dyeing or treating photographic film base and to the product so produced.

It has been common practice to dye film by applying solutions of dyes in organic liquids which carry the dyes into the body of the film, the liquid usually being a partial solvent for the film base as well as for the dye. These dyes are usually applied after the process of film forming by a series of rolls which transfer the dye to one side of the film. This dyeing may be accomplished, of course, by immersing the film or running it through a dye bath, but usually it is desired to dye but one side of the film. Where a fugitive dye is required, as in applying color backings for motion picture positive film, leader strips or for antihalation backings, this method has many disadvantages, since the dye is carried so far into the body of the film that it can usually not be removed easily, and can scarcely ever be removed quickly by water or the usual photographic baths.

An object of this invention is to render the film base capable of taking a dye.

Another object is to render the film capable of being dyed from substantially aqueous solutions if desired, to render it capable of absorbing fugitive dyes which will wash off readily in water or photographic baths, and to make it possible to dye such films more cheaply for certain purposes than is now possible. The tinted layer may be fugitive for the purpose of temporary backing, or it may be permanent, for the purposes for which such dyed film is usually employed.

My invention generally comprises three steps, which may be taken in series or two of them together. The steps are hydrolysis, mordanting and dyeing. By the first, the surface layer of the film base is partially changed chemically and more or less microscopically roughened. By the second, a substance is formed in this hydrolyzed layer which substance is capable of fixing or mordanting the dye. The mordant may be formed in situ, it may be precipitated from the solution, or it may be absorbed mechanically from the solution. I contemplate as within the scope of my invention any substance soluble in either an alkali or a hydrolyzing bath and which reacts with the film to form in the surface a mordant.

The general method of carrying out my invention is as follows. I first subject the film to an alkaline hydrolyzing bath which may contain ammonium hydroxide, an alkali hydroxide, an alkali carbonate, or an alkali sulphide or a mixture of these. Certain powerful organic amines such as tri-ethyl-amine may also be used. When such baths act on cellulose esters, there is a saponifying action or deesterification at the surface, and an analogous chemical reaction with other cellulose compounds. After washing, the mordant is applied by immersing the film in a solution of tannic acid, potassium permanganate, copper ferrocyanide, nickel hydroxide, or a number of other substances which may be used for the purpose. The mordanting bath may be combined with the hydrolyzing bath to carry out both reactions in a single step. The film may then be dyed in any one of certain classes of dyes which are well known.

When the process of hydrolyzing and mordanting is carried out in two steps, I use for example a solution of four per cent sodium hydroxide, and the bath is raised to a temperature of preferably 70 degrees centigrade, at which temperature the hydrolysis may require as little as two seconds. The temperature used is purely a matter of convenience and may range from room temperature to 100 degrees centigrade.

However, I prefer not to use a temperature over 70 degrees so as to avoid distortion of the film base. After washing the film and preferably also scrubbing it to remove particles from the surface layer which would otherwise come off later, I then allow it to soak in a solution which furnishes the mordant and I can use for this purpose, for example, a solution of 10% tannic acid containing 0.1 per cent hydrochloric acid. The film is then ready for dyeing in an aqueous solution of a basic dye, such as basic magenta, malachite green or chrysoidine. The strength of the dye solution may be about one per cent, and to the solution may be added a trace of acetic acid.

As an example of a film base prepared for dyeing in one step, I may immerse the film in a solution of sodium hydroxide containing also from $\frac{1}{10}$ to 2 per cent of potassium permanganate. The temperature is kept at the same value as before. This solution simultaneously hydrolyzes and deposits in the surface layer of the film a mordanting substance, namely, manganese dioxide. Several other baths which may be used for the one step process are sodium hydroxide and aluminum hydroxide together in solution, or antimony sulphide in sodium hdyroxide and/or sodium sulphide.

The dyes to be used for dyeing the film after hydrolyzing and mordanting are usually those soluble in water or in the usual photographic baths, which dyes are more or less easily washed out by water or are bleached by the usual photographic baths, namely the developer or fixing baths. When a dye has the latter characteristic, it is usually known as "fugitive". It is not a necessary prerequisite that the dyes have these characteristics, as for certain purposes where a permanent tint or dye is required, it is obviously not necessary or desirable that the dye shall be fugitive or wash out afterwards. The dyes which I prefer to use are generally in the class of water soluble basic dyes, as this class offers a wider choice of colors. Dyeing from substantially aqueous solutions also has marked advantages in not causing distortion of the film base, leaving the dye relatively on the surface of the film so that it can be removed if desired, and causing less swelling of the base in the dyeing process. The solvents to be used for the dye are preferably water but they may be alcohol, some suitable solvent miscible with water, or any other solvent which may be useful in this method.

For example, a dye may be used which is soluble both in alcohol and water, such as basic magenta, in the following way. The dye bath is made up in alcoholic solution and the film is dyed from this bath. Later this dye may be removed if necessary or desirable by means of water or the usual treatment in photographic baths. In cases where the dye is afterwards to be removed from the film, this may occur in two ways; it may come out by solution and diffusion in a solvent of the dye, or it may come out by mechanical disintegration, that is, by a breaking up of the surface which holds the dye. This latter, for example, may be accomplished by removing the mordant which holds the dye. When a permanent tint is desired, the dye bath may consist of the dye and any suitable organic solvents which slightly attack the base, such as methyl alcohol or a higher alcohol with a true solvent such as acetone.

The process of hydrolyzing and mordanting, and the dyeing also, if desired, may be carried out continuously at the time the film base is first formed. After the film is formed and cured it can be then led into a special set of machines for the hydrolyzing and mordanting and/or dyeing.

These machines may be of the type now in use, with slight modifications, such machines comprising a plurality of rolls to carry the dye to the film surface or the hydrolyzing and mordanting substances where possible, or a series of baths into which the film is run continuously. By this means the film base would be delivered either dyed or in a condition ready for dyeing.

My invention may be applied to any film composed of cellulose nitrate, cellulose acetate, or other ester, cellulose ether, or regenerated cellulose such as viscose. It is, however, particularly adapted to cellulose nitrate and cellulose acetate as now used.

This process offers several advantages. Film base may be dyed from substantially aqueous solutions, which has heretofore been difficult, but which offers many advantages over the older methods of dyeing from non-aqueous solvents which usually carry the dye far into the body of the film. By the use of this invention it is also easily possible to back film or dye it with a fugitive dye which is removed easily in the ordinary photographic baths. Such dyes can be applied as a color backing for the purpose for which such backings are usually employed.

For permanent tints on film base, for example, for motion picture positives, dyeing from aqueous solutions offers a much wider choice of colors. For certain other purposes in which film, coated with gelatin or other substances is ordinarily used for dyeing, this invention offers the advantages of lower cost and greater convenience in that the film base is directly dyed, thereby obviating the separate operation of coating with its attendant disadvantages.

What I claim is:

1. The process of hydrolyzing and mordanting a film support of plastic cellulosic material which comprises treating it with a hydrolyzing bath and potassium permanganate.

2. The process of hydrolyzing and mordanting a film support of plastic cellulosic material which comprises treating it with a solution of sodium hydroxide and potassium permanganate.

3. The process of hydrolyzing and mordanting a film support of cellulose nitrate which comprises treating it with a solution of approximately 4% sodium hydroxide and 0.1 to 2% of potassium permanganate.

4. The process of hydrolyzing and mordanting a film support of plastic cellulosic material which comprises treating it simultaneously with a hydrolyzing bath and a mordant selected from the group composed of tannic acid, potassium permanganate, antimony sulphide, aluminum hydroxide, copper ferrocyanide, and nickel hydroxide.

5. The process of hydrolyzing and mordanting an article of plastic cellulosic material which comprises treating it with a hydrolyzing bath containing a mordant selected from the group composed of tannic acid, potassium permanganate, antimony sulphide, aluminum hydroxide, copper ferrocyanide and nickel hydroxide.

6. The process of dyeing a photographic film support of a plastic cellulosic derivative which comprises treating it with a hydrolyzing bath containing in solution a mordant selected from the group consisting of tannic acid, potassium permanganate, antimony sulphide, aluminum hydroxide, copper ferrocyanide and nickel hydroxide, and then submitting said film support to the action of a dye which is fugitive in the customary photographic baths.

7. The process of hydrolyzing and mordanting an article of plastic cellulosic material which comprises treating it with a hydrolyzing bath containing potassium permanganate.

8. The process of hydrolyzing and mordanting an article of plastic cellulosic material which comprises treating it with a hydrolyzing bath containing aluminum hydroxide.

9. The process of hydrolyzing and mordanting an article of plastic cellulosic material which comprises treating it with a hydrolyzing bath containing antimony sulphide.

KENNETH C. D. HICKMAN.